United States Patent
Xu et al.

(10) Patent No.: US 10,067,684 B2
(45) Date of Patent: Sep. 4, 2018

(54) FILE ACCESS METHOD AND APPARATUS, AND STORAGE DEVICE

(71) Applicant: Huawei Technologies Co., Ltd., Shenzhen (CN)

(72) Inventors: Jun Xu, Hangzhou (CN); Guanyu Zhu, Shenzhen (CN); Yuangang Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/606,423

(22) Filed: May 26, 2017

(65) Prior Publication Data

US 2017/0262172 A1 Sep. 14, 2017

Related U.S. Application Data

(63) Continuation of application No. PCT/CN2014/092527, filed on Nov. 28, 2014.

(51) Int. Cl.
*G06F 3/06* (2006.01)
*G06F 12/02* (2006.01)

(52) U.S. Cl.
CPC ............ *G06F 3/061* (2013.01); *G06F 3/0643* (2013.01); *G06F 3/0655* (2013.01);
(Continued)

(58) Field of Classification Search
CPC .............. G06F 12/1009; G06F 12/08; G06F 2212/1024; G06F 3/0643; G06F 12/0246;
(Continued)

(56) References Cited

U.S. PATENT DOCUMENTS

2009/0265780 A1 10/2009 Korkus et al.
2017/0153822 A1* 6/2017 Xu .................. G06F 3/0607
(Continued)

FOREIGN PATENT DOCUMENTS

| CN | 101187901 A | 5/2008 |
|---|---|---|
| CN | 103218312 A | 7/2013 |
| CN | 103246718 A | 8/2013 |

OTHER PUBLICATIONS

Machine Translation and Abstract of Chinese Publication No. CN101187901, dated May 28, 2008, 14 pages.
(Continued)

*Primary Examiner* — Zhuo Li
(74) *Attorney, Agent, or Firm* — Conley Rose, P.C.

(57) ABSTRACT

A file access method and apparatus, and a storage device are presented, where the file access method is applied to a storage device in which a file system is established based on a memory. The storage device obtains, according to a file identifier of a to-be-accessed first target file, an index node of the first target file in metadata, where the index node of the first target file stores information about first virtual space of the first target file in global virtual space. The storage device maps the first virtual space onto second virtual space of a process, and performs addressing on an added file management register to access the first target file according to a start address of the first virtual space and a base address of a page directory of the global file page table stored in the file management register.

15 Claims, 8 Drawing Sheets

(52) U.S. Cl.
CPC ........ *G06F 3/0688* (2013.01); *G06F 12/0246* (2013.01); *G06F 2212/7201* (2013.01)

(58) Field of Classification Search
CPC ............. G06F 2212/7201; G06F 3/061; G06F 3/0655; G06F 3/0688; G06F 12/0292; G06F 12/109; G06F 17/30138; G06F 2212/1016; G06F 2212/657
See application file for complete search history.

(56) References Cited

U.S. PATENT DOCUMENTS

| | | | |
|---|---|---|---|
| 2017/0168952 A1* | 6/2017 | Zhu | G06F 12/1009 |
| 2017/0168953 A1* | 6/2017 | Xu | G06F 12/1009 |
| 2017/0235499 A1* | 8/2017 | Xu | G06F 3/0608 |
| | | | 711/170 |

OTHER PUBLICATIONS

Machine Translation and Abstract of Chinese Publication No. CN103218312, dated Jul. 24, 2013, 2 pages.
Machine Translation and Abstract of Chinese Publication No. CN103246718, dated Aug. 14, 2013, 18 pages.
Foreign Communication From a Counterpart Application, PCT Application No. PCT/CN2014/092527, English Translation of International Search Report dated Jun. 5, 2015, 2 pages.
Foreign Communication From a Counterpart Application, PCT Application No. PCT/CN2014/092527, English Translation of Written Opinion dated Jun. 5, 2015, 7 pages.

* cited by examiner

FILE ACCESS METHOD AND APPARATUS, AND STORAGE DEVICE

CROSS-REFERENCE TO RELATED APPLICATIONS

This application is a continuation of International Application No. PCT/CN2014/092527, filed on Nov. 28, 2014, the disclosure of which is hereby incorporated by reference in its entirety.

TECHNICAL FIELD

The present disclosure relates to the field of storage technologies, and in particular, to a file access method and apparatus, and a storage device.

BACKGROUND

In other approaches, a file system is usually established in a disk. To increase an access speed, an MMAP manner is usually used to access the file system. A file may be mapped onto virtual space of a process; then data is read from a hard disk into a cache, and a mapping entry is generated from a cache page and added to a process page table. Therefore, the process can directly access the file by accessing the process page table.

With the development of novel non-volatile memory (NVM) technologies represented by a phase change memory (PCM), a resistive random access memory (RRAM), a magnetic random access memory (MRAM), and a ferroelectric random access memory (FRAM), an access speed of a novel NVM is increased greatly. In addition, the novel NVM can be addressed by byte, and data is written into the non-volatile memory in units of bits. Therefore, the novel NVM can be used as a memory, an NVM storage medium is managed in a page-based manner, and the NVM is directly accessed by a central processing unit (CPU). In the prior art, an NVM-based memory file system is also provided. If a memory is an NVM, and if the file system is still accessed in the MMAP manner, an access process is complex, and a cached page table entry needs to be added to the process page table. Therefore, load on the process page table is increased.

SUMMARY

Embodiments of the present disclosure provide a file access method and apparatus, and a storage device, which can reduce load on a process page table and improve access efficiency of a file system.

According to a first aspect, an embodiment of the present disclosure provides a file access method, where the method is applied to a storage device in which a file system is established based on a memory, the memory is an NVM, and the method includes receiving a first access request, where the first access request carries a first file identifier and a start address of the first access request, and the first file identifier is used to indicate a to-be-accessed first target file; obtaining an index node of the first target file according to the first file identifier, where the index node of the first target file includes information about first virtual space used to manage the first target file, the first virtual space is contiguous address space virtualized according to first physical space in the memory, the first physical space is used to store the first target file, the first virtual space is a part of preset global virtual space, the global virtual space is contiguous address space virtualized according to second physical space in the memory, and the second physical space is used to store all data in the file system; establishing a first mapping relationship between the first virtual space and second virtual space of a process, where the second virtual space is a segment of contiguous virtual address space in user space of the process; determining, from multiple disposed registers, a to-be-accessed register as a file management register according to a start address of the second virtual space, where the file management register stores a base address of a page directory of a global file page table, and the global file page table is used to point to a physical address of the first target file in the memory; converting the start address of the first access request into an access address of the first virtual space according to the first mapping relationship, where the start address of the first access request is an address in the second virtual space of the process; and accessing the file management register according to the access address of the first virtual space, to obtain the physical address of the first target file in the memory.

With reference to the first aspect, in a first possible implementation manner of the first aspect, the method further includes receiving a second access request, where the second access request carries a second file identifier, and the second file identifier is used to indicate a to-be-accessed second target file; determining, according to the second file identifier, that no index node of the second target file exists in the file system; creating an index node of the second target file in the file system; allocating third virtual space to the second target file, where the third virtual space is contiguous address space virtualized according to third physical space in the memory, the third physical space is used to store the second target file, the third virtual space is a part of the preset global virtual space, the third virtual space is different from the first virtual space, and the third physical space is different from the first physical space; and recording, in the index node of the second target file, information about the third virtual space, where the third virtual space is used to manage the second target file.

With reference to the first aspect or the first possible implementation manner of the first aspect, in a second possible implementation manner of the first aspect, the first access request is a write request, and the first access request further carries to-be-written data; and accessing the file management register according to the access address of the first virtual space, to obtain the physical address of the first target file in the memory includes determining that a fourth physical address to which the access address of the first virtual space points cannot be obtained according to the global file page table, where the fourth physical address is a physical address in the memory; allocating a physical page to the first target file; and writing the to-be-written data carried in the first access request into the allocated physical page.

With reference to the second possible implementation manner of the first aspect, in a third possible implementation manner of the first aspect, after the allocating a physical page to the first target file, the method further includes recording, in the global file page table, a physical address of the allocated physical page.

With reference to the second or third possible implementation manner of the first aspect, in a fourth possible implementation manner of the first aspect, the information about the first virtual space includes a start address and a size of the first virtual space, the first access request further includes a volume of the to-be-written data, and after the writing the to-be-written data carried in the first access request into the allocated physical page, the method further includes calculating an end address of the first access request according to the access address of the first virtual space and the volume of the to-be-written data, where the end address of the first access request is an address in the first virtual space; obtaining an updated size of the first virtual space according to the start address of the first virtual space and the end address of the first access request; and recording, in the index node of the first target file, the updated size of the first virtual space.

According to a second aspect, an embodiment of the present disclosure provides a storage device, including a memory configured to store a file system and a file, where the memory is an NVM; and a processor, connected to the memory using a memory bus, where the processor is configured to receive a first access request, where the first access request carries a first file identifier and a start address of the first access request, and the first file identifier is used to indicate a to-be-accessed first target file; obtain an index node of the first target file according to the first file identifier, where the index node of the first target file includes information about first virtual space used to manage the first target file, the first virtual space is contiguous address space virtualized according to first physical space in the memory, the first physical space is used to store the first target file, the first virtual space is a part of preset global virtual space, the global virtual space is contiguous address space virtualized according to second physical space in the memory, and the second physical space is used to store all data in the file system; establish a first mapping relationship between the first virtual space and second virtual space of a process, where the second virtual space is a segment of contiguous virtual address space in user space of the process; determine, from multiple disposed registers, a to-be-accessed register as a file management register according to a start address of the second virtual space, where the file management register stores a base address of a page directory of a global file page table, and the global file page table is used to point to a physical address of the first target file in the memory; convert the start address of the first access request into an access address of the first virtual space according to the first mapping relationship, where the start address of the first access request is an address in the second virtual space of the process; and access the file management register according to the access address of the first virtual space, to obtain the physical address of the first target file in the memory.

With reference to the second aspect, in a first possible implementation manner of the second aspect, the processor is further configured to receive a second access request, where the second access request carries a second file identifier, and the second file identifier is used to indicate a to-be-accessed second target file; determine, according to the second file identifier, that no index node of the second target file exists in the file system; create an index node of the second target file in the file system; allocate third virtual space to the second target file, where the third virtual space is contiguous address space virtualized according to third physical space in the memory, the third physical space is used to store the second target file, the third virtual space is a part of the preset global virtual space, the third virtual space is different from the first virtual space, and the third physical space is different from the first physical space; and record, in the index node of the second target file, information about the third virtual space, where the third virtual space is used to manage the second target file.

With reference to the second aspect or the first possible implementation manner of the second aspect, in a second possible implementation manner of the second aspect, when the first access request is a write request, the first access request further carries to-be-written data, and the processor is configured to determine that a fourth physical address to which the access address of the first virtual space points cannot be obtained according to the global file page table, where the fourth physical address is a physical address in the memory; allocate a physical page to the first target file; and write the to-be-written data carried in the first access request into the allocated physical page.

With reference to the second possible implementation manner of the second aspect, in a third possible implementation manner of the second aspect, the processor is further configured to, after allocating the physical page to the first target file, record, in the global file page table, a physical address of the allocated physical page.

With reference to the second or third possible implementation manner of the second aspect, in a fourth possible implementation manner of the second aspect, the information about the first virtual space includes a start address and a size of the first virtual space, the first access request further includes a volume of the to-be-written data, and the processor is further configured to calculate an end address of the first access request according to the access address of the first virtual space and the volume of the to-be-written data, where the end address of the first access request is an address in the first virtual space; obtain an updated size of the first virtual space according to the start address of the first virtual space and the end address of the first access request; and record, in the index node of the first target file, the updated size of the first virtual space.

According to a third aspect, an embodiment of the present disclosure provides a file access apparatus, where the apparatus is configured to access a file system that is established based on a memory, the memory is an NVM, and the file access apparatus includes a receiving module configured to receive a first access request, where the first access request carries a first file identifier and a start address of the first access request, and the first file identifier is used to indicate a to-be-accessed first target file; an obtaining module configured to obtain an index node of the first target file according to the first file identifier, where the index node of the first target file includes information about first virtual space used to manage the first target file, the first virtual space is contiguous address space virtualized according to first physical space in the memory, the first physical space is used to store the first target file, the first virtual space is a part of preset global virtual space, the global virtual space is contiguous address space virtualized according to second physical space in the memory, and the second physical space is used to store all data in the file system; a mapping module configured to establish a first mapping relationship between the first virtual space and second virtual space of a process, where the second virtual space is a segment of contiguous virtual address space in user space of the process; a determining module configured to determine, from multiple disposed registers, a to-be-accessed register as a file management register according to a start address of the second virtual space, where the file management register stores a base address of a page directory of a global file page table, and the global file page table is used to point to a physical address of the first target file in the memory; a conversion module configured to convert the start address of the first access request into an access address of the first virtual space according to the first mapping relationship, where the start address of the first access request is an address in the second virtual space of the process; and an access module configured to access the file management register according to the access address of the first virtual space, to obtain the physical address of the first target file in the memory.

With reference to the third aspect, in a first possible implementation manner of the third aspect, the receiving module is further configured to receive a second access request, where the second access request carries a second file identifier, and the second file identifier is used to indicate a to-be-accessed second target file; and the file access apparatus further includes a judging module configured to determine, according to the second file identifier, that no index node of the second target file exists in the file system; a creating module configured to create an index node of the second target file in the file system; an allocation module configured to allocate third virtual space to the second target file, where the third virtual space is contiguous address space virtualized according to third physical space in the memory, the third physical space is used to store the second target file, the third virtual space is a part of the preset global virtual space, the third virtual space is different from the first virtual space, and the third physical space is different from the first physical space; and a recording module configured to record, in the index node of the second target file, information about the third virtual space, where the third virtual space is used to manage the second target file.

With reference to the third aspect or the first possible implementation manner of the third aspect, in a second possible implementation manner of the third aspect, when the first access request is a write request, the first access request further carries to-be-written data, and the access module is configured to determine that a fourth physical address to which the access address of the first virtual space points cannot be obtained according to the global file page table, where the fourth physical address is a physical address in the memory; allocate a physical page to the first target file; and write the to-be-written data carried in the first access request into the allocated physical page.

With reference to the second possible implementation manner of the third aspect, in a third possible implementation manner of the third aspect, the recording module is further configured to record, in the global file page table, a physical address of the allocated physical page.

With reference to the second or third possible implementation manner of the third aspect, in a fourth possible implementation manner of the third aspect, the information about the first virtual space includes a start address and a size of the first virtual space, the first access request further includes a volume of the to-be-written data, and the file access apparatus further includes an update module configured to calculate an end address of the first access request according to the access address of the first virtual space and the volume of the to-be-written data, where the end address of the first access request is an address in the first virtual space; obtain an updated size of the first virtual space according to the start address of the first virtual space and the end address of the first access request; and record, in the index node of the first target file, the updated size of the first virtual space.

According to a fourth aspect, an embodiment of the present disclosure provides a computer program product, including a computer-readable storage medium that stores program code, where an instruction included in the program code is used to perform the method in the foregoing first aspect.

The file access method provided in the embodiments of the present disclosure may be applied to a storage device in which a file system is established based on a memory. According to the method, the storage device may manage all files in the file system in a centralized manner using virtualized global virtual space, and access the file system using a specified global file page table. During specific access, the storage device may obtain, according to a file identifier of a to-be-accessed first target file, an index node of the first target file in metadata, where the index node of the first target file stores information about first virtual space of the first target file in the global virtual space; and the storage device may map the first virtual space onto second virtual space of a process according to the information that is about the first virtual space and that is recorded in the index node, and perform addressing on an added file management register. The file management register stores a base address of a page directory of the global file page table, and therefore, the first target file can be accessed according to a start address of the first virtual space and the base address of the page directory of the global file page table. In the embodiments of the present disclosure, addressing is performed on the global file page table using the newly added file management register. Therefore, a page table entry of a file does not need to be added or linked to a process page table, thereby reducing system overheads, reducing load on the process page table, and improving file access efficiency. In addition, the first virtual space is a segment of contiguous space. Therefore, according to the method described in the embodiments of the present disclosure, only information about the start address and a size of the first virtual space needs to be recorded in the index node of the first target file, and the first target file stored in the memory can be accessed continuously using the recorded information about the first virtual space.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure.

DESCRIPTION OF EMBODIMENTS

To make a person skilled in the art understand the technical solutions in the present disclosure better, the following clearly describes the technical solutions in the embodiments of the present disclosure with reference to the accompanying drawings in the embodiments of the present disclosure. The described embodiments are merely a part rather than all of the embodiments of the present disclosure.

Figure 1:
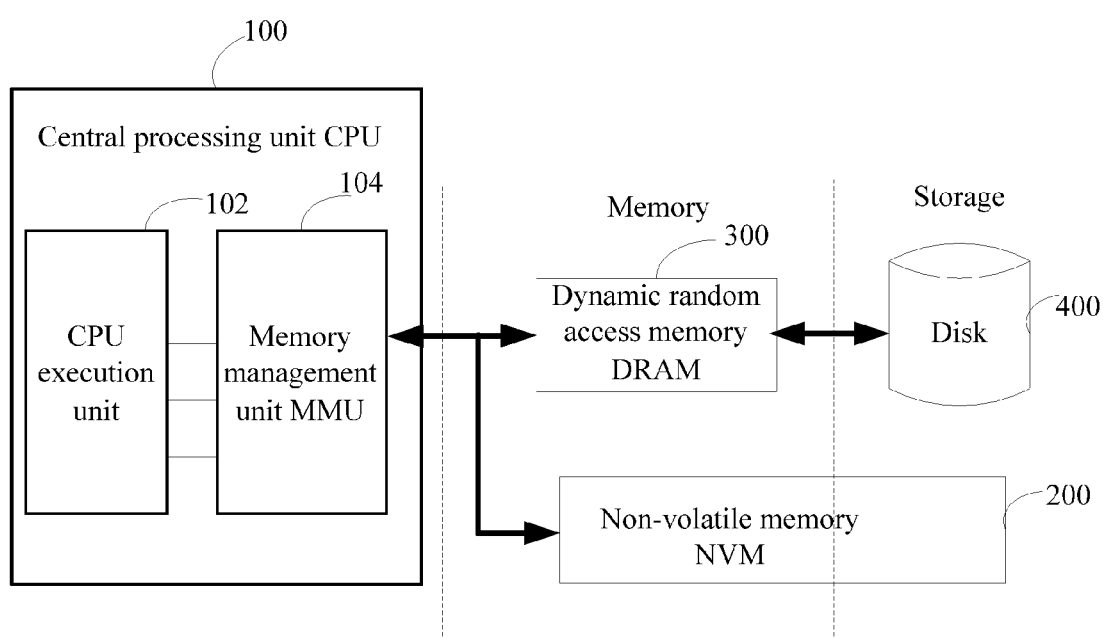
FIG. 1 is a schematic diagram of an application scenario according to an embodiment of the present disclosure.

FIG. 1 is a diagram of an application scenario of a novel NVM according to an embodiment of the present disclosure. In the application scenario described in FIG. 1, an NVM 200 is used as a memory. As shown in FIG. 1, a dynamic random access memory (DRAM) 300 is connected to a CPU 100 using a memory bus. The DRAM 300 has an advantage of high access speed. The CPU 100 can access the DRAM 300 at a high speed and perform a read or write operation on any storage unit in the DRAM 300. Therefore, the DRAM is usually used as a main memory. Generally, the DRAM 300 is used to store various software running in an operating system, input and output data, information exchanged with an external storage, and the like. However, the DRAM 300 is volatile. After a computer is powered off, information in the DRAM 300 is not stored any longer.

A disk 400 may be used as an external storage to store data. Certainly, it may be understood that a storage used as the external storage may be the disk 400, or may be a non-volatile memory such as a solid state disk (SSD). Generally, a storage medium used as the external storage needs to have a non-volatile feature. After the computer is powered off, data stored in the external storage is still stored. In addition, the external storage has a large storage capacity.

Like the DRAM 300, the novel NVM 200 may be directly connected to the memory bus. The CPU 100 may access the NVM 200 using a memory management unit (MMU) 104, and rapidly store data into the NVM 200 or read data from the NVM 200. It may be understood that, when the NVM 200 is directly connected to the memory bus for use, like the DRAM 300, a data access latency can also be reduced. In addition, compared with the DRAM 300, the NVM 200 is non-volatile, and therefore can better store data.

It should be noted that the non-volatile memory that is described in this embodiment of the present disclosure and can be connected to the memory bus may include novel non-volatile memories such as a PCM, a RRAM, a MRAM, and a FRAM. All these novel NVMs have a high access speed and a non-volatile feature. In addition, these novel NVMs can be addressed by byte, and data is written into the non-volatile memories in units of bits.

This embodiment of the present disclosure relates to a memory-based file system. In this embodiment of the present disclosure, the NVM 200 stores the file system and a file. A person skilled in the art may know that the file system is a software structure, responsible for managing and storing file information, in the operating system. From a perspective of a system, the file system is a system that organizes and allocates space of a file storage device and that is responsible for storing a file and protecting and retrieving the stored file. The file system includes three parts: a file system interface, a software set used to control and manage a file, and data and attribute of a file. A central concept of the file system includes a superblock, an inode, a data block, a directory block, and an indirection block. The superblock includes overall information of the file system, for example, a size of the file system. The inode includes all information of a file except a file name. The file name and a quantity of inodes are stored together in the directory block. A directory entry includes the file name and the quantity of inodes of the file. The inode has only space of few data blocks. If more space is required, pointer space pointing to the data block is allocated dynamically. These dynamically allocated blocks are indirection blocks. In this embodiment of the present disclosure, the NVM 200 may further store data and metadata of the file.

The operating system and another software program are installed in the CPU 100, and therefore, the CPU 100 can access the DRAM 300, the disk 400, and the NVM 200. The CPU 100 may include a CPU execution unit 102 and the memory management unit MMU 104. The CPU execution unit 102 is an execution component of the CPU 100 and is configured to execute a program. The MMU 104 is computer hardware responsible for processing a memory access request of the CPU. The MMU 104 is a control line, used to manage a virtual memory and a physical memory, in the CPU 100, and is responsible for mapping a virtual address and a physical address and providing memory access authorization based on a hardware mechanism.

It may be understood that, in this embodiment of the present disclosure, the CPU 100 is merely an example of a processor. The processor may be the CPU 100, may be another application-specific integrated circuit (ASIC), or may be configured as one or more integrated circuits implementing this embodiment of the present disclosure.

For a better understanding of this embodiment of the present disclosure, the following describes in detail how the MMU maps a virtual address onto a physical address in the memory. First, a concept of a virtual memory is briefly described. A person in the art may know that a program needs to be placed in the memory for running. However, with a continuous increase in a program scale, it is difficult to accommodate an entire program in the memory. Accordingly, the concept of the virtual memory is proposed. A basic idea of the virtual memory is that an overall size of a program, data, and a stack can be greater than a size of a physical memory, and the operating system stores, in the memory, a part of the program, data and stack that are used currently, and stores, in a disk, another part of the program, data and stack that are not used currently. For example, if a computer has a memory of only 4 megabytes (MB), when the computer needs to run a program of 16 MB, the operating system may determine, by means of selection, to buffer program content of 4 MB in the memory for running, and to exchange a program fragment between the memory and the disk when necessary. In this way, a program of 16 MB can run on a computer with a memory of only 4 MB.

A person in the art may know that, in a computer system, virtual address space is a virtual address range that can be accessed by a process. A size of the virtual address space is generally determined according to an instruction set architecture of the computer. For example, a range of virtual address space provided by a 32-bit CPU is 0 to 0xFFFFFFFF (4 gigabytes (GB)). An address in the virtual address space is referred to as a virtual address. Physical address space and a physical address are corresponding to the virtual address space and the virtual address. The physical address space refers to a physical address range of the memory. An address in the physical address space is referred to as a physical address. Generally, the physical address space is smaller than the virtual address space, and the physical address space may be mapped onto the virtual address space. For example, for a 32-bit x86 host with a memory of 256 MB, a virtual address space range of the host is 0 to 0xFFFFFFFF (4 GB), and a physical address space range is 0x000000000 to 0x0FFFFFFF (256 MB).

In other approaches, most of machines use virtual memories; a virtual address (or referred to as a linear address) is not directly sent to an address bus, but sent to an, and the MMU converts the virtual address into a physical address.

That is, the MMU is configured to map a virtual address of a program onto a physical address in the memory.

To implement mapping from a virtual address of a program onto a physical address in the memory, a paging mechanism is introduced in the MMU. The virtual address space is divided in units of pages, and a page in the virtual address space may be referred to as a virtual page. Correspondingly, the physical address space is also divided in units of pages, and a page in the physical address space may be referred to as a physical page (or referred to as a physical page frame). A size of the virtual page is the same as a size of the physical page.

On the basis of introducing the concept of a page, the MMU maps a virtual address onto a physical address in the memory in a form of a multilevel page table. In a second-level management mode, the mapping manner includes queries for a page directory and a page table sequentially. Base addresses of multiple page tables are stored in the page directory, and multiple page table entries are stored in each page table. A physical base address of a physical page corresponding to the virtual address is recorded in a page table entry.

A person in the art may know that a virtual address includes information used to find a physical address. A size of a virtual address is 4 bytes (32 bits). Generally, the virtual address may be divided into three parts:

the $22^{th}$ bit to the $31^{st}$ bit: the 10 bits (the most significant 10 bits) are an index in a page directory;

the $12^{th}$ bit to the $21^{st}$ bit: the 10 bits are an index in a page table; and the $0^{th}$ bit to the $11^{th}$ bit: the 12 bits (the least significant 12 bits) are an intra-page offset.

A person in the art may know that each process has its own dedicated virtual address space and a dedicated page directory that is used for addressing, all processes in the system share virtual address space of a kernel and a page directory of the kernel, and each process may trap in the kernel by means of a system call. A register CR3 that is used to store a base address of a page directory exists in the CPU. During process scheduling, the register CR3 points to a base address of a page directory of a current process. During process switching, the register CR3 switches the base address of the page directory to which it currently points. For a virtual address that is to be converted into a physical address, the CPU first finds, according to a value in the register CR3, a physical page in which the page directory is located. Then, the CPU finds a corresponding page directory entry (PDE) using values of the 10 bits (the most significant 10 bits) from the $22^{th}$ bit to the $31^{st}$ bit of the virtual address as an index, where a physical address of a page table corresponding to the virtual address exists in the PDE; and finds a corresponding page table entry (PTE) in the page table according to the physical address of the page table using values of the 10 bits from the $12^{th}$ bit to the $21^{st}$ bit of the virtual address as an index. A physical address of a physical page corresponding to the virtual address exists in the page table entry. Finally, the CPU obtains, using the least significant 12 bits of the virtual address, that is, the intra-page offset, plus the physical address of the physical page, the physical address corresponding to the virtual address.

Generally, one page directory has 1024 entries, and the most significant 10 bits of the virtual address can be used exactly for indexing the 1024 entries (2 to the power 10 is equal to 1024). One page table also has 1024 entries, and the 10 bits in the middle part of the virtual address are used exactly for indexing the 1024 page table entries. The least significant 12 bits (2 to the power 12 is equal to 4096) of the virtual address, used as the intra-page offset, can be used exactly for indexing 4 kilobytes (KB) physical page, that is, each byte in one physical page.

A person in the art may know that an addressing range of a 32-bit pointer is from 0x00000000 to 0xFFFFFFFF (4 GB). That is, one 32-bit pointer can be used for addressing to each byte in entire 4 GB address space. One page table entry may be responsible for a mapping between a virtual page and a physical memory. One page table has 1024 entries, and one page table may be responsible for mappings of 1024*4 kB=4 MB address space. One page directory entry is corresponding to one page table. One page directory has 1024 entries, corresponding to 1024 page tables. Each page table is responsible for a mapping of 4 MB address space, and 1024 page tables are responsible for mappings of 1024*4 MB=4 GB address space. One process has one page directory. Therefore, a page directory and a page table, in units of pages, can ensure a mapping between each page in the 4 GB address space and the physical memory.

Each process has its own 4 GB address space, that is, from 0x00000000 to 0xFFFFFFFF. A mapping from a virtual address of each process onto a physical address in the memory is implemented using a page directory and a page table of the process. Each process has its own page directory and page table, and therefore, a physical memory mapped onto address space of each process is different. Values of two processes at a same virtual address (if there is a physical memory mapped to the virtual address for both of the two processes) are usually different, because different processes are usually corresponding to different physical pages.

The foregoing describes in detail a process of mapping, by the MMU, a virtual address of a program onto a physical address in the memory. In this embodiment of the present disclosure, because the NVM 200 is used as the memory, and the NVM 200 can store data permanently, the file system can be established based on the NVM 200, and metadata and file data in the file system are directly stored in the memory NVM 200. The MMU 104 may map a virtual address and a physical address in the NVM 200, and therefore, the CPU 100 can directly access the file system in the NVM 200.

It may be understood that the application scenario shown in FIG. 1 may be applied to a storage device in which a file system is established based on a memory. In this embodiment of the present disclosure, the storage device may include a device in which a file system is established based on a memory, such as a computer, a server, or a storage array. An application scenario of the embodiments of the present disclosure is not limited herein. The following describes in detail a file access method in an embodiment of the present disclosure with reference to the application scenario shown in FIG. 1. It should be noted that unless otherwise specified, a memory described in this embodiment of the present disclosure is an NVM and may refer to the NVM 200 in FIG. 1.

Figure 2:
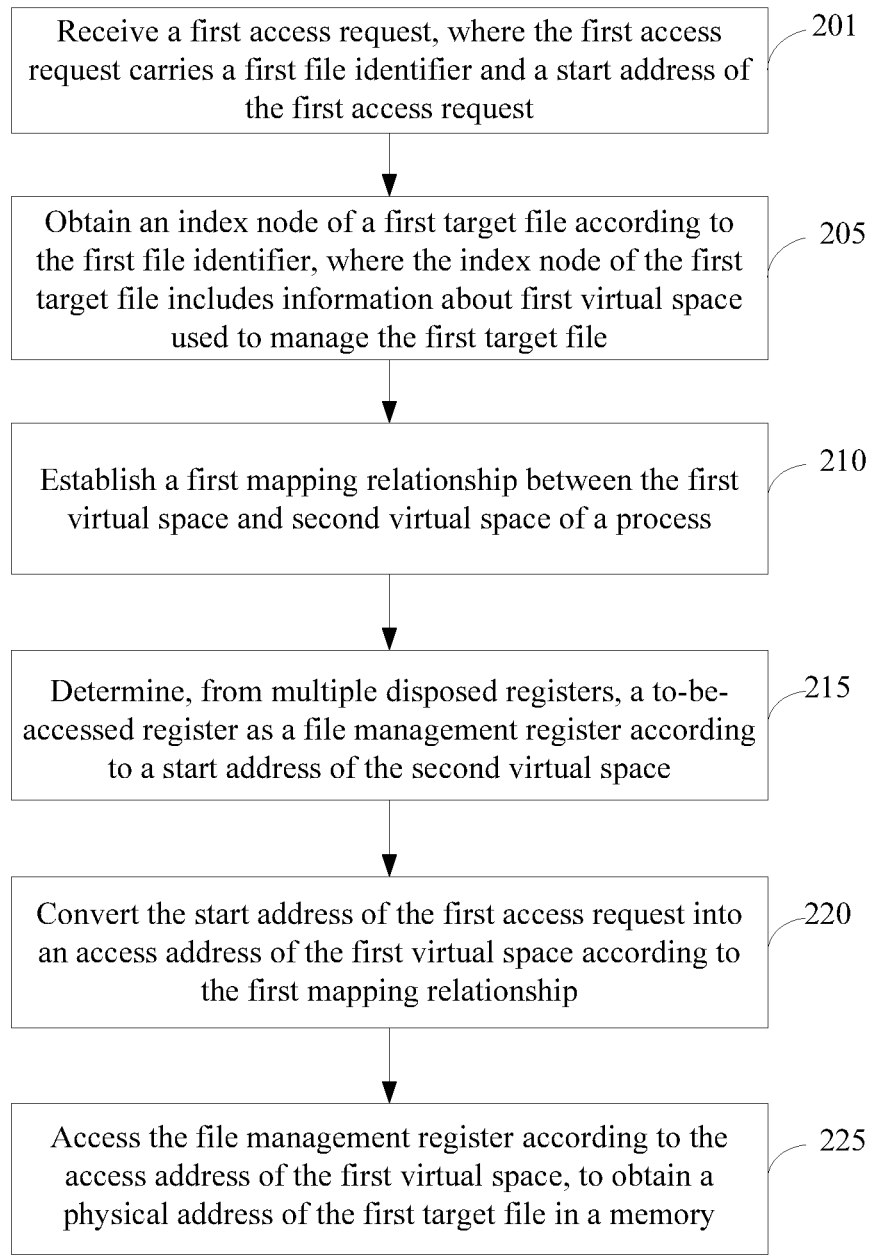
FIG. 2 is a flowchart of a file access method according to an embodiment of the present disclosure.

FIG. 2 is a flowchart of a file access method according to an embodiment of the present disclosure. The method may be applied to the application scenario shown in FIG. 1. The method may be performed by a processor in a device in which a file system is established based on a memory, such as a storage device, a computer, or a server. For example, the method may be performed by the CPU 100 shown in FIG. 1. The following describes the method in FIG. 2 in detail with reference to FIG. 1. As shown in FIG. 2, the method may include the following steps.

In step 201, the CPU 100 receives a first access request, where the first access request carries a first file identifier and a start address of the first access request, and the first file identifier is used to indicate a to-be-accessed first target file. In an actual application, a file identifier may be a file name, for example, File_1.doc. The file identifier is a unique identifier for identifying a file in the file system. Because the file system provided in this embodiment of the present disclosure is established based on a novel NVM that can be addressed by byte, the CPU 100 can directly access the NVM using a memory bus. The start address of the first access request is used to determine a start location of data of the to-be-accessed first target file. In this embodiment of the present disclosure, the start address of the first access request is a virtual address in virtual address space of a process.

In step 205, the CPU 100 obtains an index node of the first target file according to the first file identifier, where the index node of the first target file includes information about first virtual space used to manage the first target file. The first virtual space is contiguous address space virtualized according to first physical space in the memory, and the first physical space is used to store the first target file. The first virtual space is a part of preset global virtual space, the global virtual space is contiguous address space virtualized according to second physical space in the memory, and the second physical space is used to store all data in the file system.

In this embodiment of the present disclosure, all the data in the file system may be stored in the NVM 200. Because the CPU 100 can directly access the NVM 200 using the memory bus, space of the NVM 200 can be managed in a form of a physical page. The file system includes multiple files. Therefore, for ease of clear description, in this embodiment of the present disclosure, memory space used to store data of the entire file system is referred to as the second physical space, and space in the NVM 200 that is used to store the first target file is referred to as the first physical space. It may be understood that the first physical space may be non-contiguous physical space. In an actual application, the first physical space may include multiple non-contiguous physical pages, and the data of the first target file is stored in the multiple physical pages. In this embodiment of the present disclosure, to improve file access efficiency, the CPU 100 may manage the entire file system according to virtualized global virtual space. The global virtual space is contiguous address space virtualized according to the second physical space. Therefore, physical space in the NVM 200 that is used to store the files can be accessed continuously using the virtualized contiguous global virtual space. The CPU 100 may search for metadata of the file system according to the first file identifier, to obtain an index node of the first target file according to the first file identifier. A person in the art may know that the metadata refers to data used to describe file data. For example, the metadata includes information used to describe a location and a size of a file. In this embodiment of the present disclosure, the index node of the first target file includes information about first virtual space used to manage the first target file. The first virtual space is a part of the global virtual space and is contiguous address space virtualized according to the first physical space in the memory that is used to store the first target file. It may be understood that the information about the first virtual space may include a start address of the first virtual space and a size of the first virtual space. The start address of the first virtual space is a start address of the first target file in the global virtual space. The size of the first virtual space is a virtual size of the first target file, and the size of the first virtual space may be greater than or equal to a size of the first target file.

Figure 3:
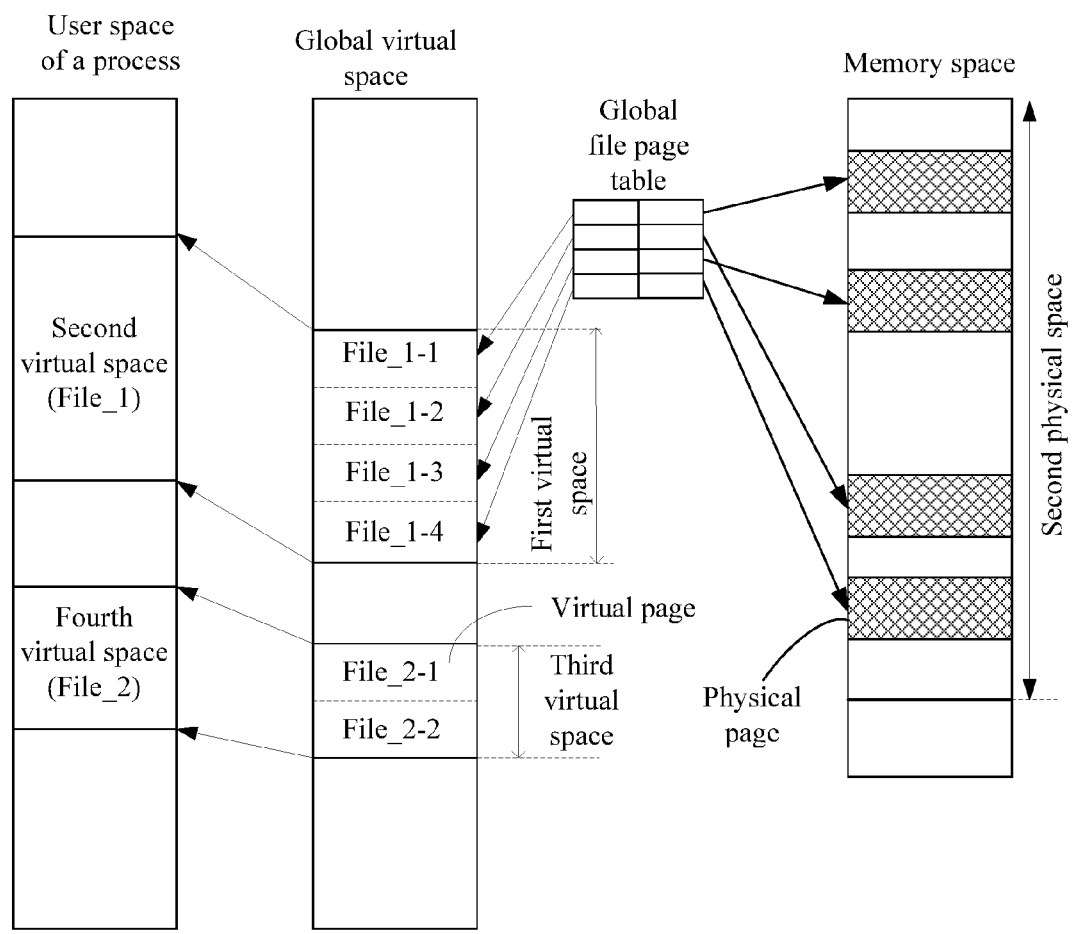
FIG. 3 is a schematic diagram of a file management space mapping according to an embodiment of the present disclosure.

To describe the solution more clearly, the following describes in detail the first virtual space and the first physical space in this embodiment of the present disclosure with reference to FIG. 3. FIG. 3 is a schematic diagram of a file management space mapping according to an embodiment of the present disclosure. As shown in FIG. 3, the first target file is stored in four non-contiguous physical pages (refer to four physical pages shown as shadow parts in FIG. 3) in the NVM 200, and for ease of description, the four physical pages used to store the first target file are referred to as the first physical space (which is not shown in FIG. 3). The first virtual space is a segment of contiguous address space virtualized according to the first physical space. It may be understood that the size of the first virtual space is not less than a size of the first physical space. The first virtual space is a part of the global virtual space. The global virtual space includes virtual space used to manage all the files in the file system. For example, the global virtual space includes the first virtual space used to manage the first target file (File_1), and further includes third virtual space used to manage a second target file (File_2) and other virtual space (which is not shown in FIG. 3) used to manage other files. For ease of description, the following uses the first virtual space as an example for description. To manage the first target file (File_1), an example in which the size of the first virtual space is equal to the size of the first physical space is used. The first virtual space includes four virtual pages. A size of each virtual page is the same as a size of a physical page in the memory. For example, both the size of the virtual page and the size of the physical page may be 4 KB. The four virtual pages of the first virtual space are respectively used to virtualize the four physical pages used to store data (for example, File_1-1, File_1-2, File_1-3, and File_1-4) of the first target file File_1, and are respectively mapped onto four physical pages in the memory. In this embodiment of the present disclosure, a mapping between a virtual page of the first virtual space and a physical page in the memory may be implemented using a global file page table.

For ease of description, in this embodiment of the present disclosure, space in the memory that is used to store data of the file system is referred to as the second physical space. It may be understood that, in one case, the memory may be used to store only the data of the file system, and data that does not belong to the file system may be accessed using the DRAM 300 and the disk 400 shown in FIG. 1. In this case, the second physical space may be the entire space of the NVM 200. In another case, the NVM 200 is not only used to store the data of the file system, but also may be used to store data that does not belong to the file system. In this case, in addition to the second physical space, the memory may further include physical space used to store the data that does not belong to the file system. Therefore, no limitation is imposed herein, and in this embodiment of the present disclosure, only the second physical space used to store the data of the file system is described.

In step 210, the CPU 100 establishes a first mapping relationship between the first virtual space and second virtual space of a process. A person skilled in the art may know that a process is a structural basis of an operating system, and the process is a running activity that is of a program having an independent function and that is about a data set, and may be considered as one time of execution of the program. A kernel is a core of the operating system, and provides the most basic functions of the operating system. The kernel is a basis for working of the operating system and is responsible for managing a process and a memory of the system. Each process has its own dedicated virtual address space and a dedicated page directory that is used for addressing. In addition, each process may trap in the kernel by means of a system call. Therefore, all processes in the system share virtual address space of the kernel and a page directory of the kernel. When any process needs to access the virtual address space of the kernel, a base address of a page table in the page directory of the kernel needs to be copied into a page directory of the process. For ease of description, one process is used as an example for description in this embodiment of the present disclosure.

To enable the CPU 100 to access the first target file in the memory using the memory bus, avoid that file access efficiency is reduced due to the system call when the operating system accesses the file system, and continuously access a file in a user mode, in this embodiment of the present disclosure, the first virtual space may be mapped onto second virtual space of a process accessing the first target file. The second virtual space is a segment of contiguous virtual address space in user space of the process. A person skilled in the art may know that, in the operating system, a virtual memory is generally divided into two parts: user space and kernel space. Core software such as a kernel and a driver runs in the kernel space, and an ordinary application runs in the user space. The user space is space that all processes have a right to access. A program running in the user space has a low right level, and only some system resources that are allowed to be used by the program can be seen. A program running in the kernel space has a high right level, and has all rights to access a hardware device.

As shown in FIG. 3, the first virtual space used to manage the first target file may be mapped onto the second virtual space in the user space of the process, where the second virtual space is not greater than the first virtual space. For ease of clear description, in this embodiment of the present disclosure, a mapping relationship between the first virtual space and the second virtual space is referred to as the first mapping relationship. During mapping, in one case, the first virtual space may be mapped onto the second virtual space according to the start address and the size of the first virtual space and a preset mapping offset. In this mapping manner, though the size of the first virtual space is the same as a size of the second virtual space, the start address of the first virtual space is different from a start address of the second virtual space, and a difference between the start addresses is a mapping offset. In this case, the start address of the second virtual space may be calculated according to the start address of the first virtual space and the preset mapping offset. In another case, the first virtual space may be directly mapped onto the second virtual space according to the start address and the size of the first virtual space. In this mapping manner, the start address of the first virtual space is the same as the start address of the second virtual space, and the size of the first virtual space is the same as the size of the second virtual space. In other words, in this mapping manner, it may be considered that a mapping offset is 0. In an actual application, after the first mapping relationship between the first virtual space and the second virtual space is established, a pointer pointing to the start address of the second virtual space may be returned to the process.

In step 215, the CPU 100 determines a to-be-accessed file management register from multiple disposed registers according to a start address of the second virtual space, where the file management register stores a base address of a page directory of a global file page table, and the global file page table is used to point to a physical address of the first target file in the memory. As described above, if a process running in the user mode needs to access the memory, a virtual address in user space of the process needs to be converted into a physical address in the memory using an MMU. In this embodiment of the present disclosure, multiple registers are disposed in the CPU 100 to reduce load on a process page table and to reduce load on the system caused by the system call. In addition to existing register CR0 to register CR3, the CPU 100 further includes a register specially used for managing the file system. For ease of description, in this embodiment of the present disclosure, the register specially used for managing the file system is referred to as a file management register. In this embodiment of the present disclosure, the register CR3 stores a base address of a page directory of the process page table. The file management register stores the base address of the page directory of the global file page table. The base address of the page directory of the process page table refers to a start physical address of the page directory of the process page table. The base address of the page directory of the global file page table refers to a start physical address of the page directory of the global file page table. The global file page table is used to point to physical addresses, in the memory, of all files in the file system.

In this embodiment of the present disclosure, all processes accessing the file system need to use a disposed file management register to access the file system in the NVM 200. All the processes of accessing the file system access the file management register to convert virtual addresses in the global virtual space into physical addresses in the space of the NVM 200; and a process that does not access the file system needs to use the existing register CR3 to implement access to other space in the DRAM 300 or the NVM 200 except space used to store the data of the file system. In an actual application, a to-be-accessed register may be determined according to a start address of to-be-accessed user space. For example, if the start address of the to-be-accessed user space is in a range from 0x00000000 to 0xF0000000, it is determined that the to-be-accessed register is the register CR3; if the start address of the to-be-accessed user space is in a range from 0xF0000000 to 0xFFFFFFFF, it is determined that the to-be-accessed register is the file management register. In this step, the MMU 104 in the CPU 100 may determine, from the multiple disposed registers, the to-be-accessed register as the file management register according to the start address of the second virtual space. The file management register stores the base address of the page directory of the global file page table. Therefore, in this step, the global file page table may point to the physical address of the first target file in the NVM 200.

Figure 4:
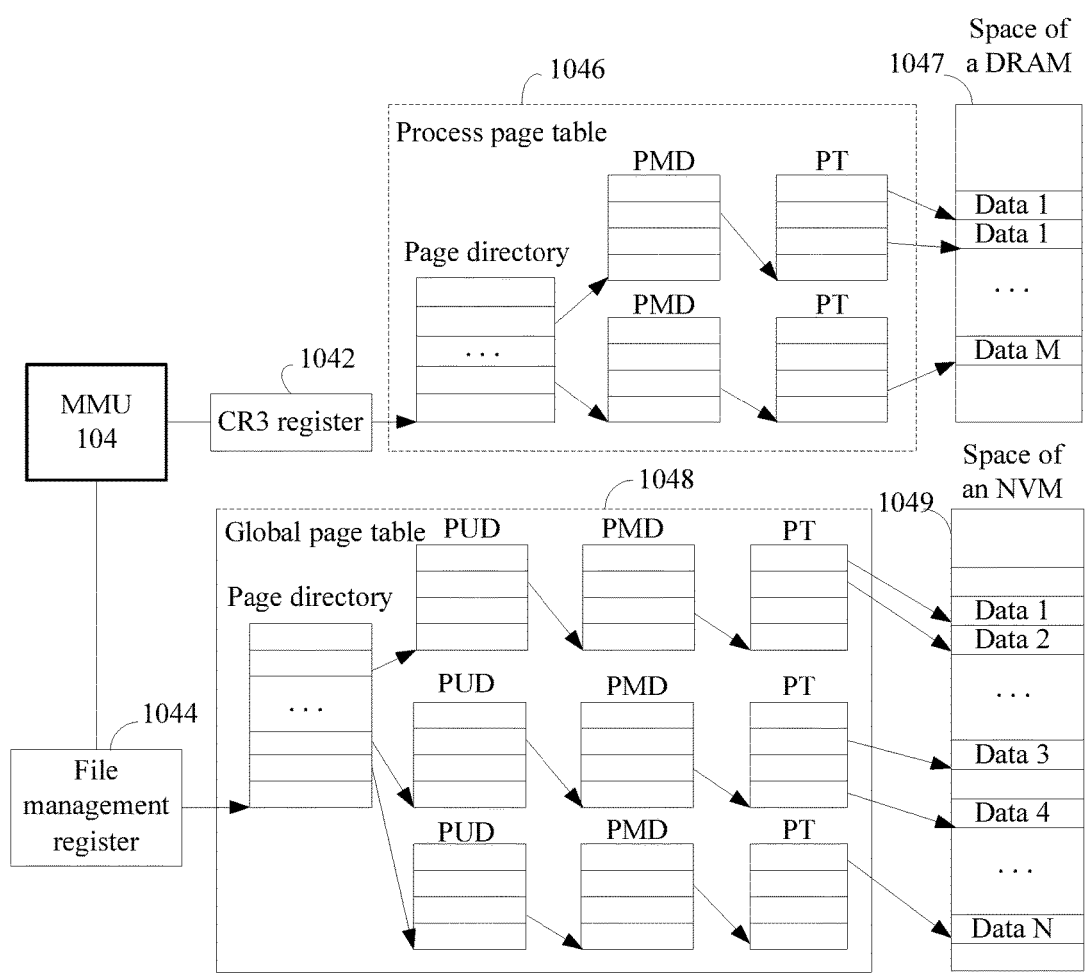
FIG. 4 is a schematic diagram of a page table according to an embodiment of the present disclosure.

To describe this embodiment of the present disclosure more clearly, the following describes the global file page table in this embodiment of the present disclosure with reference to FIG. 4. FIG. 4 is a schematic diagram of a page table according to an embodiment of the present disclosure. As shown in FIG. 4, in this embodiment of the present disclosure, at least a register CR3 1042 and a file management register 1044 are disposed in a CPU (for example, the CPU 100 in FIG. 1). The MMU 104 may access a process page table 1046 by accessing the register CR3 1042, and the MMU 104 may access a global file page table 1048 by accessing the file management register 1044. The register CR3 1042 stores a base address of a page directory of the process page table 1046, and the file management register 1044 stores a base address of a page directory of the global file page table 1048. The process page table 1046 is used to point to a physical address of a physical page in space 1047 of the DRAM. The global file page table 1048 is used to point to a physical address of a physical page in the space 1049 of the NVM. Both the process page table 1046 and the global file page table 1048 may be single-level page tables or multilevel page tables. For example, as shown in FIG. 4, the process page table 1046 may include a page directory, a page middle directory (PMD), and a page table (PT), and the global file page table 1048 may include a page directory, a page upper directory (PUD), a PMD, and a PT. A PTE in the PT of the process page table 1046 includes a physical address that points to the physical page in the space 1047 of the DRAM, and a page table entry in the PT of the global file page table 1048 includes a physical address that points to the physical page in the space 1049 of the NVM.

In step 220, the CPU 100 converts the start address of the first access request into an access address of the first virtual space according to the first mapping relationship. As described above, to improve file access efficiency, in this embodiment of the present disclosure, the global virtual space virtualized according to the second physical space used to store all data of the file system is a segment of contiguous address space, and continuous access operations can be performed on multiple discrete physical pages of a file by accessing the file using the specified global virtual space. During specific access, an address of the first virtual space of the first target file may be converted into the physical address of the first physical space of the first target file in the NVM 200 according to the file management register. In an actual application, during processing of a process, a to-be-accessed register needs to be determined according to virtual address space of the process, and the file management register converts a virtual address of the global virtual space of the file system into a physical address of the file system in the NVM 200. Therefore, in this step, an address of the second virtual space needs to be converted into an address of the first virtual space. In a specific implementation, the start address of the first access request is an address in virtual space of the process. Therefore, the start address of the first access request may be an address in the second virtual space. In this step, the access address of the first virtual space may be determined according to the start address of the first access request and a specified mapping offset. It may be understood that, if the specified mapping offset is 0, the start address of the first virtual space is the same as the start address of the second virtual space.

Figure 5:
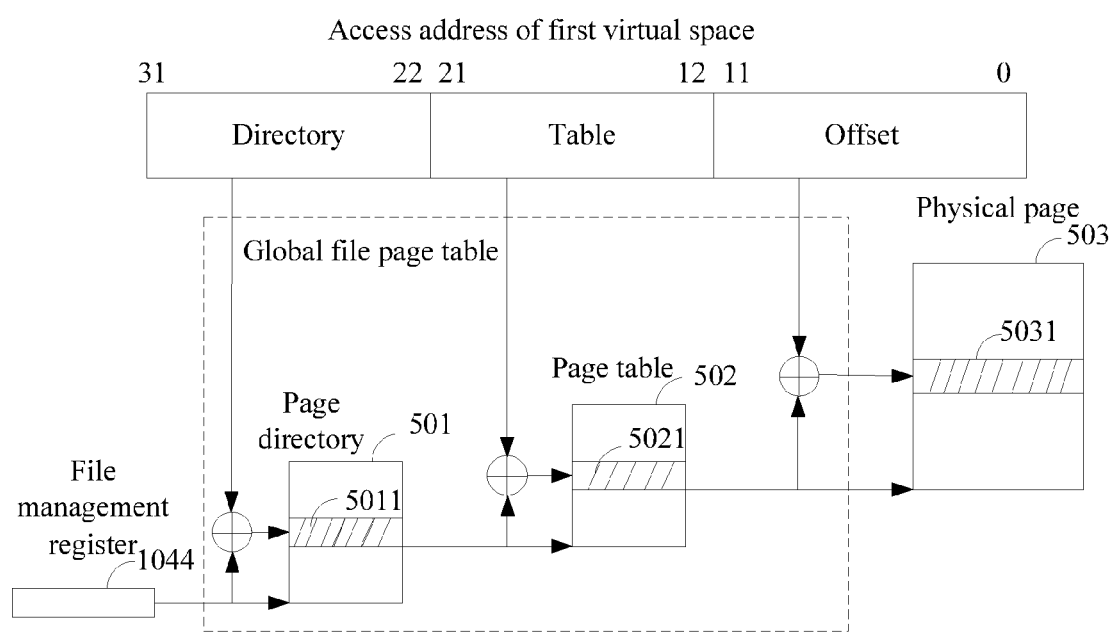
FIG. 5 is a schematic diagram of accessing a global file page table according to an embodiment of the present disclosure.

In step 225, the CPU 100 accesses the file management register according to the access address of the first virtual space, to obtain the physical address of the first target file in the memory. The following describes this step in detail with reference to FIG. 5. FIG. 5 is a schematic diagram of accessing a global file page table according to an embodiment of the present disclosure. As shown in FIG. 5, the MMU 104 in the CPU 100, as shown in FIG. 1, may access a global file page table (for example, the global file page table 1048 shown in FIG. 4) by accessing the file management register 1044. For ease of description, an example in which the access address of the first virtual space is a 32-bit virtual address is used for description in FIG. 5.

In the embodiment shown in FIG. 5, the global file page table may include a page directory 501 and a page table 502. During specific access, the MMU 104 may obtain a base address of the page directory 501 of the global file page table by accessing the file management register 1044, and find a page directory entry 5011 in the page directory 501 using the base address of the page directory 501 as a start address and using the most significant 10 bits (from the $22^{nd}$ bit to the $31^{st}$ bit) of the access address of the first virtual space as an offset. The page directory entry 5011 includes a start physical address of the page table 502, and a page table entry 5021 is found in the page table 502 according to the start physical address of the page table 502 using the middle 10 bits (from the $12^{th}$ bit to the $21^{st}$ bit) of the access address of the first virtual space as an offset. The page table entry 5021 stores a start physical address of a physical page 503 of the first target file in the memory. A to-be-accessed line 5031 is found in the physical page 503 according to the start physical address of the physical page 503 using the least significant 12 bits (from the $0^{th}$ bit to the $11^{th}$ bit) of the access address of the first virtual space as an offset. An address of the line 5031 is a start physical address of the to-be-accessed first target file in the memory.

It may be understood that, during memory access, data reading/writing may be performed using a line as a granularity, and therefore, after the to-be-accessed line 5031 is determined, an access operation may be performed on the NVM 200 according to a physical address of a start location of the access. For example, if the first access request is a read request, a location of the line 5031 in the physical page 503 may be used as a start location of data to be read, and a data reading instruction is sent to a memory controller according to a physical address of the start location of the data to be read, to instruct the memory controller to perform a read operation on the first target file. If the first access request is a write request, a location of the line 5031 may be used as a start location of newly written data, and a data writing instruction is sent to a memory controller according to a physical address of the start location of the new data to be written, to instruct the memory controller to perform a write operation on the first target file. It can be seen from the embodiment shown in FIG. 5 that, the CPU 100 can obtain the physical address of the first target file in the memory by accessing the file management register 1044 according to the access address of the first virtual space, thereby achieving an objective of accessing the first target file.

Figure 6:
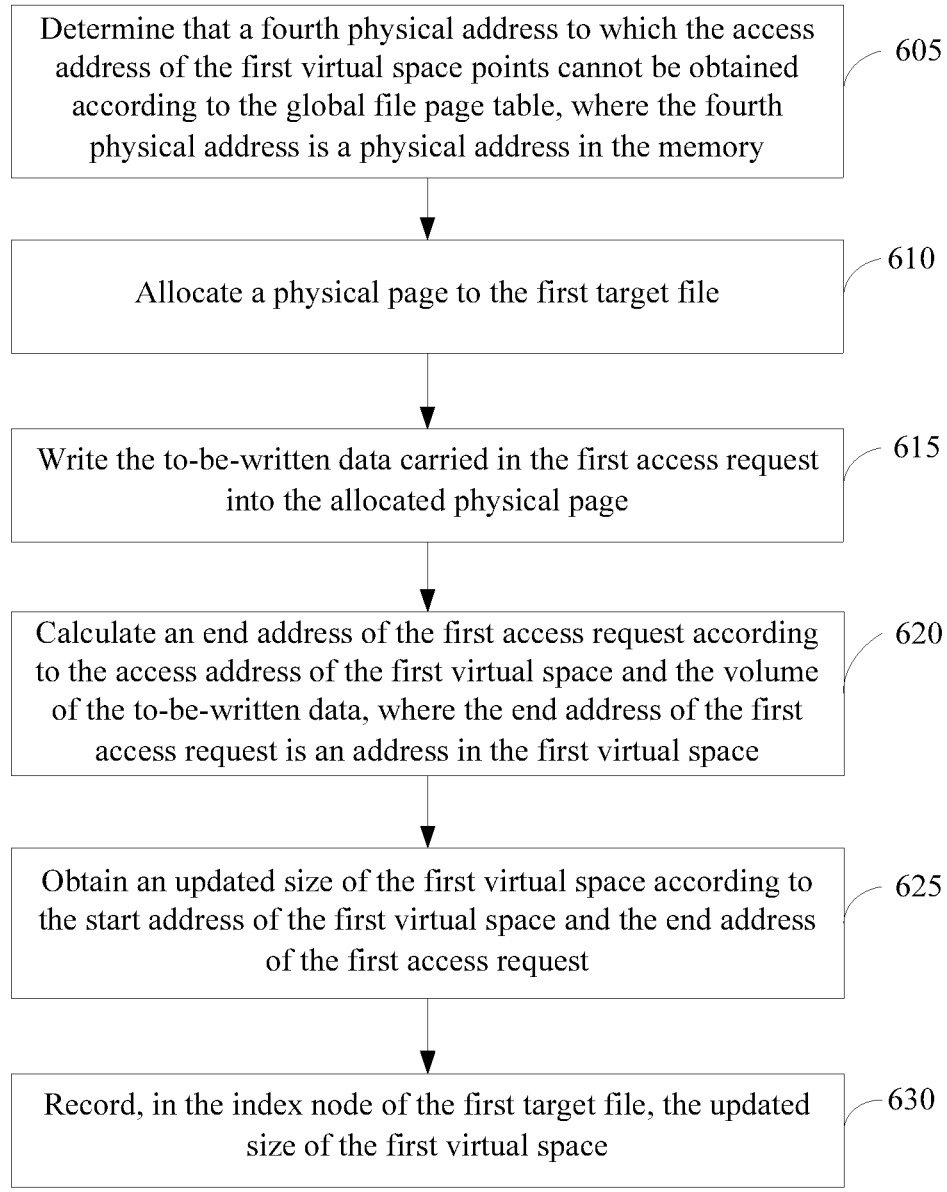
FIG. 6 is a flowchart of a file writing method according to an embodiment of the present disclosure.

In an actual application, to allocate memory space flexibly, a physical page in the memory may be dynamically allocated to the first target file during a write operation. The following describes, in detail with reference to FIG. 6, a specific process of the write operation performed in step 225 shown in FIG. 2. FIG. 6 is a flowchart of a file writing method according to an embodiment of the present disclosure. The following describes FIG. 6 using an example in which the first access request is a write request. As shown in FIG. 6, the method may include the following steps.

In step 605, the CPU 100 determines that a fourth physical address to which the access address of the first virtual space points cannot be obtained according to the global file page table, where the fourth physical address is a physical address in the memory. In an actual application, in one case, when a file is expanded, physical memory space allocated to the file may become insufficient, and new memory space needs to be provided to store the file. In another case, to allocate physical memory space flexibly, save a free memory, and improve a system throughput, when a new file is created, no physical memory space is pre-allocated to the file, but instead, only when there is data to be written into the file, physical memory space is allocated to the file according to a volume of the to-be-written data. In these two cases, after the start address of the first access request is converted into the access address of the first virtual space according to the first mapping relationship, when the first target file is accessed according to the access address of the first virtual space, if no physical page has been allocated to the to-be-written data, no physical address of a physical page for the to-be-written data is recorded in the global file page table. In this step, the MMU 104 in the CPU 100 cannot obtain, according to the access address of the first virtual space and the global file page table, the physical address of the physical page for the to-be-written data in the memory. For ease of clear description, in this embodiment of the present disclosure, a physical address that is of a physical page in the NVM 200 and to which the access address of the first virtual space points is referred to as the fourth physical address.

In step 610, the CPU 100 allocates a physical page to the first target file. When the MMU 104 in the CPU 100 determines that the fourth physical address to which the access address of the first virtual space points cannot be obtained according to the global file page table, the MMU 104 triggers a page fault request, to request the kernel of the operating system running on the CPU 100 to allocate a physical page in the NVM 200 to the process accessing the first target file. The kernel of the operating system may allocate, from an idle physical page in the memory, a physical page to the first target file according to the page fault request. It may be understood that, when the first access request is a write request, the first access request not only carries the first file identifier, but also may carry a volume of the to-be-written data, and when allocating a physical page, the kernel of the operating system may allocate the physical page according to the volume of the to-be-written data.

In an actual application, after allocating the physical page to the first target file, the kernel of the operating system needs to record, in the global file page table, a physical address of the allocated physical page. The kernel of the operating system needs to establish, in the global file page table, a corresponding page table entry for the allocated physical page, and record the physical address of the allocated physical page in the established page table entry, so that the physical address of the allocated physical page can be found according to the start address of the first access request during a subsequent access operation.

In step 615, the CPU 100 writes to-be-written data carried in the first access request into the allocated physical page. It may be understood that, when the first access request is a write request, the first access request needs to carry the to-be-written data. After the physical page is allocated to the first target file, the MMU 104 may return the physical address of the allocated physical page to the CPU 100. The CPU 100 may send a data writing command to the memory controller according to the physical address of the allocated physical page, to instruct to write the to-be-written data carried in the first access request into the allocated physical page.

In this embodiment of the present disclosure, after a write operation performed on the newly allocated physical page is complete, metadata of the first target file may be further updated according to a result of the write operation. A specific update process may include the following steps.

In step 620, the CPU 100 calculates an end address of the first access request according to the access address of the first virtual space and the volume of the to-be-written data, where the end address of the first access request is an address in the first virtual space. In an actual application, after the to-be-written data carried in the first access request is written into the allocated physical page, the CPU 100 may calculate the end address of the first access request according to the access address of the first virtual space and the volume of the to-be-written data. It may be understood that the access address of the first virtual space is a virtual address in the global virtual space, and therefore, the end address of the first access request is also a virtual address in the global virtual space. The end address of the first access request is an address in the first virtual space. For example, if the start address of the first access request is 0x00000000 and the volume of the to-be-written data is 8 KB, the end address of the first access request is 0x00002000.

In step 625, the CPU 100 obtains an updated size of the first virtual space according to the start address of the first virtual space and the end address of the first access request. It may be understood that, after the data is written into the first target file, an updated size of the first target file may be obtained according to the start address of the first virtual space and the end address of the first access request that is obtained in step 620. The updated size of the first target file is the updated size of the first virtual space.

In step 630, the CPU 100 records, in the index node of the first target file, the updated size of the first virtual space. The information about the first virtual space used to manage the first target file is recorded in the index node of the first target file. Therefore, after the write operation is performed on the first target file, metadata information of the first target file needs to be updated according to a result of the write operation. As described above, the information that is about the first virtual space and is recorded in the index node of the first target file includes the start address and the size of the first virtual space, and the size of the first target file may be obtained according to the start address and the size of the first virtual space. After the updated size of the first virtual space is obtained in step 625, in this step, the updated size of the first virtual space may be recorded in the index node of the first target file, to update the metadata of the first target file.

According to the file access method provided in this embodiment of the present disclosure, a CPU 100 may manage all files in a file system in a centralized manner using virtualized global virtual space, and access the file system using a specified global file page table. During specific access, the CPU 100 may obtain, according to a file identifier of a to-be-accessed first target file, an index node of the first target file in metadata, where the index node of the first target file stores information about first virtual space of the first target file in the global virtual space. The CPU 100 may map the first virtual space onto second virtual space of a process according to the information that is about the first virtual space and that is recorded in the index node, and perform addressing on an added file management register using an MMU 104 in the CPU 100. The file management register stores a base address of a page directory of the global file page table, and therefore, the MMU 104 can access the first target file according to a start address of the first virtual space and the base address of the page directory of the global file page table. The first virtual space is a segment of contiguous space. Therefore, according to the method described in this embodiment of the present disclosure, only information about the start address and a size of the first virtual space needs to be recorded in the index node of the first target file, and the first target file stored in a memory can be accessed continuously using the recorded information about the first virtual space. In addition, in this embodiment of the present disclosure, addressing is performed on the global file page table using the newly added file management register. Therefore, a page table entry of a file does not need to be added or linked to a process page table, thereby reducing system overheads, reducing load on the process page table, and improving file access efficiency.

Figure 7:
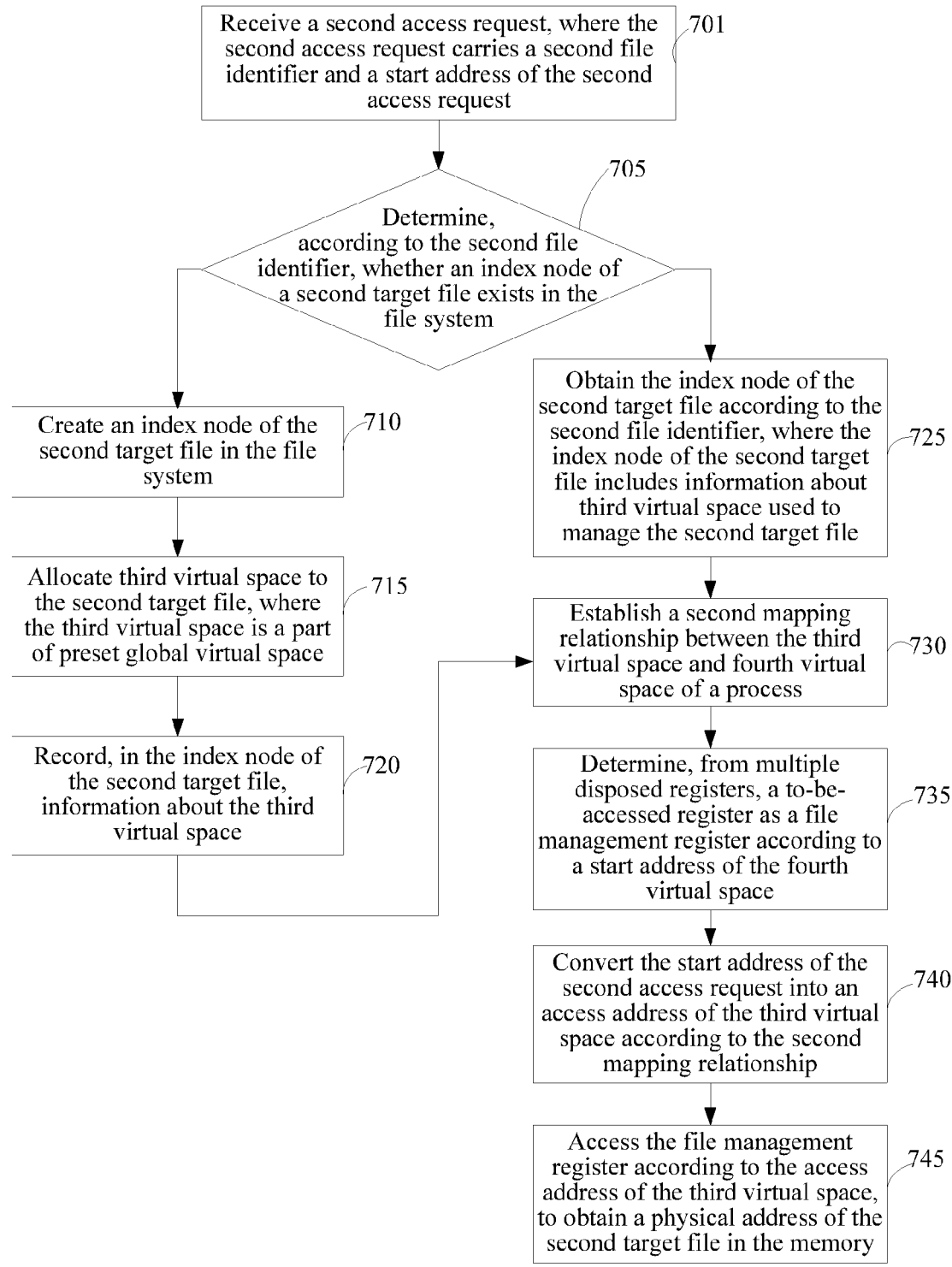
FIG. 7 is a flowchart of another file access method according to an embodiment of the present disclosure.

FIG. 7 is a flowchart of another file access method according to an embodiment of the present disclosure. The method may be applied to the application scenario shown in FIG. 1. The following describes the method in FIG. 7 with reference to FIG. 1 and FIG. 2. As shown in FIG. 7, the method may include the following steps.

In step 701, the CPU 100 receives a second access request, where the second access request carries a second file identifier and a start address of the second access request, and the second file identifier is used to indicate a to-be-accessed second target file. For example, the second file identifier may be File_2.doc. It should be noted that the second target file and the first target file are different files in a file system.

In step 705, the CPU 100 determines, according to the second file identifier, whether an index node of the second target file exists in the file system. If no index node of the second target file exists in the file system according to the second file identifier, perform step 710; otherwise, perform step 725. In an actual application, the CPU 100 may search for metadata of the file system according to the second file identifier to determine whether an index node of the second target file exists. A person in the art may know that, if no index node of the second target file exists in the metadata, it indicates that the second target file does not exist in the file system. A person in the art may know that, if the second access request is a read request, the operating system running on the CPU 100 may return an access error response to a process accessing the second target file; or if the second access request is a write request, the system may perform step 710.

In step 710, the CPU 100 creates an index node of the second target file in the file system. An index node of the second target file may be added to the metadata of the file system according to the second file identifier.

In step 715, third virtual space is allocated to the second target file, where the third virtual space is contiguous address space virtualized according to third physical space in the memory. After the index node of the second target file is created, for ease of managing the second target file, the third virtual space needs to be allocated to the second target file in preset global virtual space. The third virtual space is a part of the preset global virtual space, and the third virtual space is a segment of contiguous virtual space. The third virtual space may be obtained by virtualizing the third physical space in memory. The third physical space is physical space in the memory that is used to store the second target file. Certainly, in an actual application, the third physical space may refer to a little physical space that is pre-allocated to the second target file in the memory when the second target file is created; and the third virtual space may also refer to space that is occupied in the memory when the second target file is an empty file. It may be understood that, in this embodiment of the present disclosure, the third virtual space is different from the first virtual space, and the third physical space is different from the first physical space.

In step 720, the CPU 100 records, in the index node of the second target file, information about the third virtual space, where the third virtual space is used to manage the second target file. In an actual application, after the index node of the second target file is created and the third virtual space is allocated to the second target file, for ease of managing the second target file, the information about the third virtual space needs to be recorded in the index node of the second target file. The information about the third virtual space includes a start address and a size of the third virtual space. It may be understood that, after step 710, step 715, and step 720 are performed, the second target file can be accessed according to metadata information of the created second target file. For example, a write operation may be implemented on the second target file using the method described in step 730 to step 745.

In step 725, the CPU 100 obtains the index node of the second target file according to the second file identifier, where the index node of the second target file includes the information about the third virtual space used to manage the second target file, the third virtual space is the contiguous address space virtualized according to the third physical space (which is not shown in FIG. 3) in the memory, the third physical space is used to store the second target file, and the third virtual space is a part of the preset global virtual space.

In step 730, the CPU 100 establishes a second mapping relationship between the third virtual space and fourth virtual space of a process, where the fourth virtual space is a segment of contiguous virtual address space in user space of the process.

In step 735, the CPU 100 determines, from multiple disposed registers, a to-be-accessed register as a file management register according to a start address of the fourth virtual space, where the file management register stores a base address of a page directory of a global file page table, and the global file page table is used to point to a physical address of the second target file in the memory. The global file page table may be used to point to a start address of the second target file in the third physical space in the memory.

In step 740, the CPU 100 converts the start address of the second access request into an access address of the third virtual space according to the second mapping relationship.

In step 745, the CPU 100 accesses the file management register according to the access address of the third virtual space, to obtain the physical address of the second target file in the memory. The MMU 104 in the CPU 100 may access the file management register according to the access address of the third virtual space, to perform addressing to a physical address of the second target file in the third physical space in the memory, so as to access the second target file.

It should be noted that step 725 to step 745 in FIG. 7 are similar to step 205 to step 225 described in FIG. 2 respectively. For details, refer to the descriptions of step 205 to step 225, and details are not described herein again.

Figure 8:
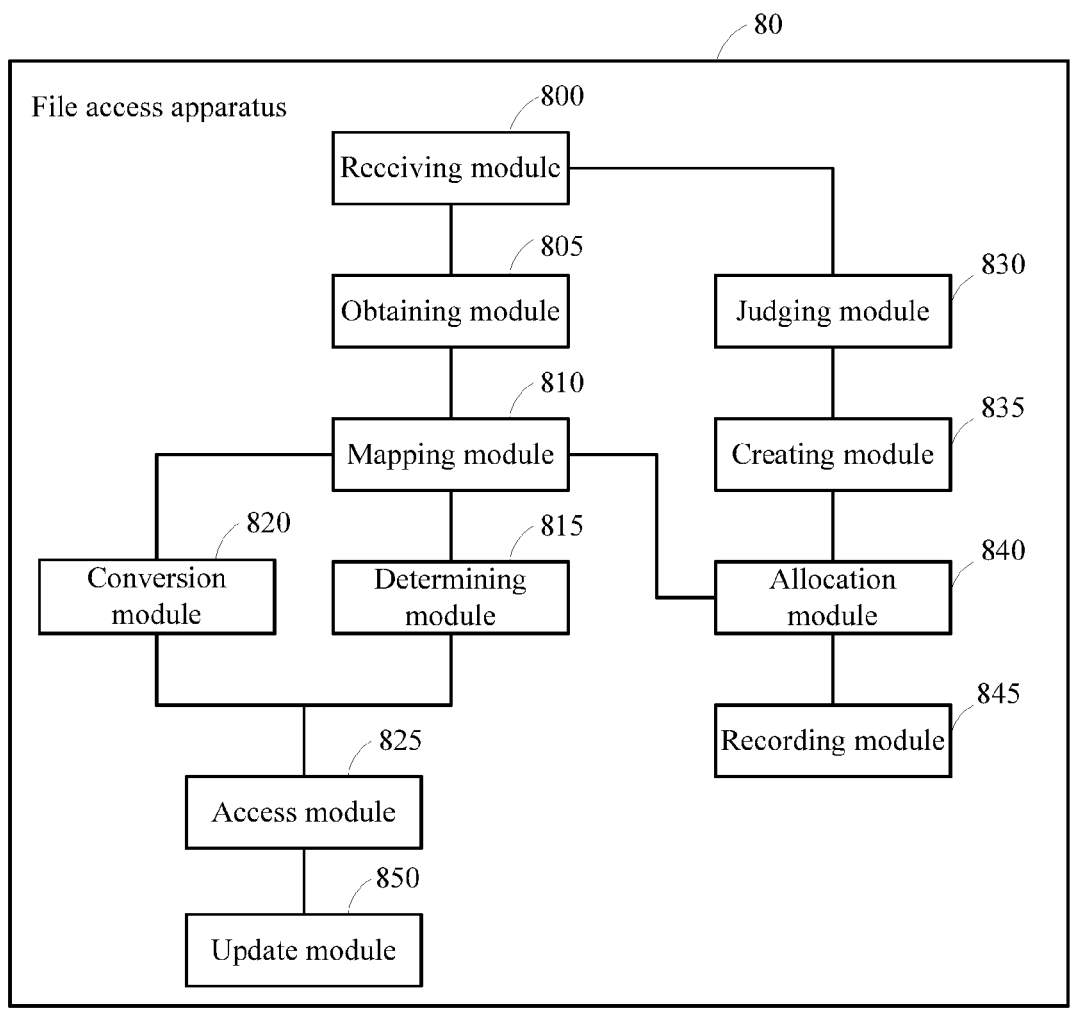
FIG. 8 is a schematic structural diagram of a file access apparatus according to an embodiment of the present disclosure.

FIG. 8 is a schematic structural diagram of a file access apparatus according to an embodiment of the present disclosure. The apparatus may be configured to access a file system that is established based on a memory, where the memory is an NVM. As shown in FIG. 8, the file access apparatus 80 may include the following modules: a receiving module 800 configured to receive a first access request, where the first access request carries a first file identifier and a start address of the first access request, and the first file identifier is used to indicate a to-be-accessed first target file; an obtaining module 805 configured to obtain an index node of the first target file according to the first file identifier, where the index node of the first target file includes information about first virtual space used to manage the first target file, the first virtual space is contiguous address space virtualized according to first physical space in the memory, the first physical space is used to store the first target file, the first virtual space is a part of preset global virtual space, the global virtual space is contiguous address space virtualized according to second physical space in the memory, and the second physical space is used to store all data in the file system; a mapping module 810 configured to establish a first mapping relationship between the first virtual space and second virtual space of a process, where the second virtual space is a segment of contiguous virtual address space in user space of the process; a determining module 815 configured to determine, from multiple disposed registers, a to-be-accessed register as a file management register according to a start address of the second virtual space, where the file management register stores a base address of a page directory of a global file page table, and the global file page table is used to point to a physical address of the first target file in the memory; a conversion module 820 configured to convert the start address of the first access request into an access address of the first virtual space according to the first mapping relationship, where the start address of the first access request is an address in the second virtual space of the process; and an access module 825 configured to access the file management register according to the access address of the first virtual space, to obtain the physical address of the first target file in the memory.

In one case, the receiving module 800 in the file access apparatus 80 provided in this embodiment of the present disclosure is further configured to receive a second access request, where the second access request carries a second file identifier, and the second file identifier is used to indicate a to-be-accessed second target file. The file access apparatus 80 provided in this embodiment of the present disclosure may further include a judging module 830, a creating module 835, an allocation module 840, and a recording module 845.

The judging module 830 is configured to determine, according to the second file identifier, that no index node of the second target file exists in the file system.

The creating module 835 is configured to create an index node of the second target file in the file system.

The allocation module 840 is configured to allocate third virtual space to the second target file, where the third virtual space is contiguous address space virtualized according to third physical space in memory, the third physical space is used to store the second target file, the third virtual space is a part of the preset global virtual space, the third virtual space is different from the first virtual space, and the third physical space is different from the first physical space.

The recording module 845 is configured to record, in the index node of the second target file, information about the third virtual space, where the third virtual space is used to manage the second target file.

In an actual application, in the file access apparatus 80 provided in this embodiment of the present disclosure, the information about the first virtual space may include a start address and a size of the first virtual space. When the first access request is a write request, the access module 825 is configured to determine that a fourth physical address to which the access address of the first virtual space points cannot be obtained according to the global file page table, where the fourth physical address is a physical address in the memory; allocate a physical page to the first target file; and write to-be-written data carried in the first access request into the allocated physical page. The recording module 845 is further configured to record, in the global file page table, a physical address of the allocated physical page.

In another case, the information about the first virtual space includes a start address and a size of the first virtual space, the first access request may further include a volume of the to-be-written data, and the file access apparatus 80 may further include an update module 850 configured to calculate an end address of the first access request according to the access address of the first virtual space and the volume of the to-be-written data, obtain an updated size of the first virtual space according to the start address of the first virtual space and the end address of the first access request, and record, in the index node of the first target file, the updated size of the first virtual space. The end address of the first access request is an address in the first virtual space.

The file access apparatus 80 provided in this embodiment of the present disclosure can perform the file access methods described in the embodiments in FIG. 2 to FIG. 7. For details about functions of the modules, refer to the descriptions in the method embodiments, and details are not described herein again.

It may be understood that the embodiment shown in FIG. 8 is merely exemplary. For example, the module division is merely logical function division and may be other division in actual implementations. For example, multiple modules or components may be combined or integrated into another device, or some features may be ignored or not performed. In addition, the displayed or discussed mutual couplings or direct couplings or communication connections may be implemented using some communications interfaces. The indirect couplings or communication connections between the modules may be implemented in electronic, mechanical, or other forms.

The modules described as separate parts may or may not be physically separated, and parts displayed as modules may or may not be physical units, may be located in one position, or may be distributed on multiple network units. A part or all of the modules may be selected according to actual needs to achieve the objectives of the solutions of the embodiments.

According to the file access apparatus 80 provided in this embodiment of the present disclosure, all files in a file system may be managed in a centralized manner using virtualized global virtual space, and the file system may be accessed using a specified global file page table. During specific access, addressing may be performed on the global file page table using a newly added file management register. Therefore, a page table entry of a file does not need to be copied into a process page table, thereby reducing load on the process page table, and improving file access efficiency.

An embodiment of the present disclosure further provides a computer program product for data processing, including a computer-readable storage medium that stores program code, where an instruction included in the program code is used to execute the method process described in any one of the foregoing method embodiments. A person of ordinary skill in the art may understand that the foregoing storage medium includes any non-transitory machine-readable medium capable of storing program code, such as a universal serial bus (USB) flash drive, a removable hard disk, a magnetic disk, an optical disc, a random access memory (RAM), an SSD, or a non-volatile memory.

It should be noted that the embodiments provided in this application are merely exemplary. A person skilled in the art may clearly know that, for convenience and conciseness of description, in the foregoing embodiments, the embodiments emphasize different aspects, and for a part not described in detail in one embodiment, reference may be made to the relevant description of another embodiment. The embodiments of the present disclosure, claims, and features disclosed in the accompanying drawings may exist independently, or exist in combination. Features described in a hardware form in the embodiments of the present disclosure may be executed by software, and vice versa, which is not limited herein.

What is claimed is:

1. A file access method, wherein the method is applied to a storage device in which a file system is established based on a memory, wherein the memory is a non-volatile memory (NVM), and wherein the method comprises:

receiving a first access request, wherein the first access request carries a first file identifier and a start address of the first access request, and wherein the first file identifier is used to indicate a to-be-accessed first target file;
obtaining an index node of the first target file according to the first file identifier, wherein the index node of the first target file comprises information about first virtual space used to manage the first target file, wherein the first virtual space is contiguous address space virtualized according to first physical space in the memory, wherein the first physical space is used to store the first target file, wherein the first virtual space is a part of preset global virtual space, wherein the global virtual space is contiguous address space virtualized according to second physical space in the memory, and wherein the second physical space is used to store all data in the file system;
establishing a first mapping relationship between the first virtual space and second virtual space of a process, wherein the second virtual space is a segment of contiguous virtual address space in user space of the process;
converting the start address of the first access request into an access address of the first virtual space according to the first mapping relationship, wherein the start address of the first access request is an address in the second virtual space of the process; and
accessing a file management register according to the access address of the first virtual space in order to obtain the physical address of the first target file in the memory, wherein the file management register is selected, from multiple disposed registers, as a to-be-accessed register according to a start address of the second virtual space, wherein the file management register stores a base address of a page directory of a global file page table, and wherein the global file page table is used to point to the physical address of the first target file in the memory.

2. The file access method according to claim 1, further comprising:
receiving a second access request, wherein the second access request carries a second file identifier, and wherein the second file identifier is used to indicate a to-be-accessed second target file;
creating an index node of the second target file in the file system when it is determined, according to the second file identifier, no index node of the second target file exists in the file system;
allocating third virtual space to the second target file, wherein the third virtual space is contiguous address space virtualized according to third physical space in the memory, wherein the third physical space is used to store the second target file, wherein the third virtual space is a part of the preset global virtual space, wherein the third virtual space is different from the first virtual space, and wherein the third physical space is different from the first physical space; and
recording, in the index node of the second target file, information about the third virtual space, wherein the third virtual space is used to manage the second target file.

3. The file access method according to claim 1, wherein the first access request is a write request and further carries to-be-written data, and wherein accessing the file management register according to the access address of the first virtual space in order to obtain the physical address of the first target file in the memory comprises:
allocating a physical page to the first target file when a fourth physical address to which the access address of the first virtual space points cannot be obtained according to the global file page table, wherein the fourth physical address is a physical address in the memory; and
writing the to-be-written data carried in the first access request into the allocated physical page.

4. The method according to claim 3, wherein after allocating the physical page to the first target file, the method further comprises recording, in the global file page table, a physical address of the allocated physical page.

5. The method according to claim 3, wherein the information about the first virtual space comprises a start address and a size of the first virtual space, wherein the first access request further comprises a volume of the to-be-written data, and after writing the to-be-written data carried in the first access request into the allocated physical page, the method further comprises:
calculating an end address of the first access request according to the access address of the first virtual space and the volume of the to-be-written data, wherein the end address of the first access request is an address in the first virtual space;
obtaining an updated size of the first virtual space according to the start address of the first virtual space and the end address of the first access request; and
recording, in the index node of the first target file, the updated size of the first virtual space.

6. A storage device, comprising:
a memory configured to store a file system and a file, wherein the memory is a non-volatile memory (NVM); and
a processor coupled to the memory using a memory bus, wherein the processor is configured to:
receive a first access request, wherein the first access request carries a first file identifier and a start address of the first access request, and wherein the first file identifier is used to indicate a to-be-accessed first target file;
obtain an index node of the first target file according to the first file identifier, wherein the index node of the first target file comprises information about first virtual space used to manage the first target file, wherein the first virtual space is contiguous address space virtualized according to first physical space in the memory, wherein the first physical space is used to store the first target file, wherein the first virtual space is a part of preset global virtual space, wherein the global virtual space is contiguous address space virtualized according to second physical space in the memory, and wherein the second physical space is used to store all data in the file system;
establish a first mapping relationship between the first virtual space and second virtual space of a process, wherein the second virtual space is a segment of contiguous virtual address space in user space of the process;
convert the start address of the first access request into an access address of the first virtual space according to the first mapping relationship, wherein the start address of the first access request is an address in the second virtual space of the process; and
access a file management register according to the access address of the first virtual space in order to obtain the physical address of the first target file in the memory, wherein the file management register is selected, from multiple disposed registers, as a to-be-accessed register according to a start address of the second virtual space, wherein the file management register stores a base address of a page directory of a global file page table, and wherein the global file page table is used to point to the physical address of the first target file in the memory.

7. The storage device according to claim 6, wherein the processor is further configured to:
   receive a second access request, wherein the second access request carries a second file identifier, and wherein the second file identifier is used to indicate a to-be-accessed second target file;
   create an index node of the second target file in the file system when it is determined, according to the second file identifier, no index node of the second target file exists in the file system;
   allocate third virtual space to the second target file, wherein the third virtual space is contiguous address space virtualized according to third physical space in the memory, wherein the third physical space is used to store the second target file, wherein the third virtual space is a part of the preset global virtual space, wherein the third virtual space is different from the first virtual space, and wherein the third physical space is different from the first physical space; and
   record, in the index node of the second target file, information about the third virtual space, wherein the third virtual space is used to manage the second target file.

8. The storage device according to claim 6, wherein when the first access request is a write request, the first access request further carries to-be-written data, and wherein the processor is configured to:
   allocate a physical page to the first target file when a fourth physical address to which the access address of the first virtual space points cannot be obtained according to the global file page table, wherein the fourth physical address is a physical address in the memory; and
   write the to-be-written data carried in the first access request into the allocated physical page.

9. The storage device according to claim 8, wherein the processor is further configured to record, in the global file page table, a physical address of the allocated physical page after allocating the physical page to the first target file.

10. The storage device according to claim 8, wherein the information about the first virtual space comprises a start address and a size of the first virtual space, wherein the first access request further comprises a volume of the to-be-written data, and wherein the processor is further configured to:
    calculate an end address of the first access request according to the access address of the first virtual space and the volume of the to-be-written data, wherein the end address of the first access request is an address in the first virtual space;
    obtain an updated size of the first virtual space according to the start address of the first virtual space and the end address of the first access request; and
    record, in the index node of the first target file, the updated size of the first virtual space.

11. A computer program product comprising one or more computer-executable instructions, wherein the one or more computer-executable instructions, when executed on a processor of a storage system, cause the storage system to carry out:
    receiving a first access request, wherein the first access request carries a first file identifier and a start address of the first access request, and wherein the first file identifier is used to indicate a to-be-accessed first target file;
    obtaining an index node of the first target file according to the first file identifier, wherein the index node of the first target file comprises information about first virtual space used to manage the first target file, wherein the first virtual space is contiguous address space virtualized according to first physical space in a memory, wherein the first physical space is used to store the first target file, wherein the first virtual space is a part of preset global virtual space, wherein the global virtual space is contiguous address space virtualized according to second physical space in the memory, wherein the second physical space is used to store all data in a file system, wherein the memory is a non-volatile memory (NVM), and wherein the file system is established based on the memory;
    establishing a first mapping relationship between the first virtual space and second virtual space of a process, wherein the second virtual space is a segment of contiguous virtual address space in user space of the process;
    converting the start address of the first access request into an access address of the first virtual space according to the first mapping relationship, wherein the start address of the first access request is an address in the second virtual space of the process; and
    accessing a file management register according to the access address of the first virtual space in order to obtain the physical address of the first target file in the memory, wherein the file management register is selected, from multiple disposed registers, as a to-be-accessed register according to a start address of the second virtual space, wherein the file management register stores a base address of a page directory of a global file page table, and wherein the global file page table is used to point to the physical address of the first target file in the memory.

12. The computer program product according to claim 11, wherein the computer-executable instructions further cause the storage system to carry out:
    receiving a second access request, wherein the second access request carries a second file identifier, and wherein the second file identifier is used to indicate a to-be-accessed second target file;
    creating an index node of the second target file in the file system when it is determined, according to the second file identifier, no index node of the second target file exists in the file system;
    allocating third virtual space to the second target file, wherein the third virtual space is contiguous address space virtualized according to third physical space in the memory, wherein the third physical space is used to store the second target file, wherein the third virtual space is a part of the preset global virtual space, wherein the third virtual space is different from the first virtual space, and wherein the third physical space is different from the first physical space; and recording, in the index node of the second target file, information about the third virtual space, wherein the third virtual space is used to manage the second target file.

13. The computer program product according to claim 11, wherein the first access request is a write request and further carries to-be-written data, and wherein the computer-executable instructions cause the storage system to carry out:
   allocating a physical page to the first target file when a fourth physical address to which the access address of the first virtual space points cannot be obtained according to the global file page table, wherein the fourth physical address is a physical address in the memory; and
   writing the to-be-written data carried in the first access request into the allocated physical page.

14. The computer program product according to claim 13, wherein the computer-executable instructions further cause the storage system to carry out recording, in the global file page table, a physical address of the allocated physical page.

15. The computer program product according to claim 13, wherein the information about the first virtual space comprises a start address and a size of the first virtual space, wherein the first access request further comprises a volume of the to-be-written data, and after writing the to-be-written data carried in the first access request into the allocated physical page, the computer-executable instructions further cause the storage system to carry out:
   calculating an end address of the first access request according to the access address of the first virtual space and the volume of the to-be-written data, wherein the end address of the first access request is an address in the first virtual space;
   obtaining an updated size of the first virtual space according to the start address of the first virtual space and the end address of the first access request; and
   recording, in the index node of the first target file, the updated size of the first virtual space.

* * * * *